United States Patent
Olivier et al.

(10) Patent No.: US 12,025,539 B2
(45) Date of Patent: Jul. 2, 2024

(54) SAMPLING DEVICE FOR SAMPLING FROM A SURFACE OF AN INDUSTRIAL VESSEL WITHOUT REQUIRING A PERSON TO DESCEND INTO AN INDUSTRIAL VESSEL, USING A SWAB

(71) Applicant: LABORATOIRE FRANCAIS DU FRACTIONNEMENT ET DES BIOTECHNOLOGIES, Les Ulis (FR)

(72) Inventors: Christophe Olivier, Sars et Rosieres (FR); Olivier Dupuis, Tourcoing (FR); Quentin Deltour, Loos (FR)

(73) Assignee: LABORATOIRE FRANÇAIS DU FRACTIONNEMENT ET DES BIOTECHNOLOGIES, Puteaux (FR)

( * ) Notice: Subject to any disclaimer, the term of this patent is extended or adjusted under 35 U.S.C. 154(b) by 498 days.

(21) Appl. No.: 17/297,504

(22) PCT Filed: Nov. 28, 2019

(86) PCT No.: PCT/EP2019/082974
§ 371 (c)(1),
(2) Date: May 27, 2021

(87) PCT Pub. No.: WO2020/109508
PCT Pub. Date: Jun. 4, 2020

(65) Prior Publication Data
US 2022/0034758 A1 Feb. 3, 2022

(30) Foreign Application Priority Data
Nov. 29, 2018 (FR) .................... 18 72058

(51) Int. Cl.
*G01N 1/02* (2006.01)
*B01L 3/00* (2006.01)

(52) U.S. Cl.
CPC ............. *G01N 1/02* (2013.01); *B01L 3/5029* (2013.01); *B01L 2300/0663* (2013.01);
(Continued)

(58) Field of Classification Search
None
See application file for complete search history.

(56) References Cited

U.S. PATENT DOCUMENTS 3,841,973 A   10/1974   Wilkins et al.
4,848,167 A * 7/1989   Gordon .................. G01N 1/04
                                              73/864.71
(Continued)

FOREIGN PATENT DOCUMENTS

CN   107328950 A  * 11/2017  ............. G01N 35/10
CN   109470393 B  *  7/2021  ........... G01L 5/0028
(Continued)

OTHER PUBLICATIONS

International Search Report for PCT/EP2019/082974 dated Mar. 17, 2020, 7 pages.
(Continued)

*Primary Examiner* — Peter J Macchiarolo
*Assistant Examiner* — Jermaine L Jenkins
(74) *Attorney, Agent, or Firm* — NIXON & VANDERHYE

(57) ABSTRACT

Disclosed is a module for sampling from a surface of an industrial vessel without requiring a person to descend into the industrial vessel, using a swab including a stem and a sampling tip, including a swab holder and a conveyor; the swab holder is adapted to receive and secure one end of the swab stem; and the conveyor is configured to set the swab holder in motion on the surface of the vessel.

20 Claims, 5 Drawing Sheets

(52) U.S. Cl.
CPC ............... *B01L 2300/0809* (2013.01); *B01L 2300/0883* (2013.01); *G01N 2001/028* (2013.01)

(56) References Cited

U.S. PATENT DOCUMENTS

| | | | |
|---|---|---|---|
| 5,823,592 A | 10/1998 | Kalidindi | |
| 6,466,637 B2* | 10/2002 | Bowen | G21F 9/005 |
| | | | 376/310 |
| 9,446,406 B2* | 9/2016 | Gordon | B01L 3/5029 |
| 2015/0377746 A1 | 12/2015 | Mineo | |
| 2016/0302776 A1* | 10/2016 | Adolphson | A61B 10/0096 |

FOREIGN PATENT DOCUMENTS

| | | | |
|---|---|---|---|
| DE | 102012024355 A1 * | 6/2014 | ............ A61F 13/38 |
| EP | 1 054 188 | 11/2000 | |
| FR | 2 677 925 | 12/1992 | |
| GB | 2 274 719 | 8/1994 | |
| WO | 89/11634 | 11/1989 | |

OTHER PUBLICATIONS

Written Opinion of the ISA for PCT/EP2019/082974 dated Mar. 17, 2020, 7 pages.

\* cited by examiner

SAMPLING DEVICE FOR SAMPLING FROM A SURFACE OF AN INDUSTRIAL VESSEL WITHOUT REQUIRING A PERSON TO DESCEND INTO AN INDUSTRIAL VESSEL, USING A SWAB

CROSS-REFERENCE TO RELATED APPLICATIONS

This application is the U.S. national phase of International Application No. PCT/EP2019/082974 filed Nov. 28, 2019 which designated the U.S. and claims priority to FR 18 72058 filed Nov. 29, 2018, the entire contents of each of which are hereby incorporated by reference.

BACKGROUND OF THE INVENTION

Field of the Invention

The present invention relates to the technical field of sample collection from a surface, and more particularly from a surface of an industrial vessel without requiring a person to descend therein.

Description of the Related Art

Samplings are performed in the industry on a regular basis in order to validate the initial and periodic equipment cleaning operations. These samplings may be of different kinds: residues samplings, contaminants samplings, microbiological samplings such as bacteriological samplings, etc. This also applies to industrial vessels. Such vessels are for example used in the food, cosmetic, pharmaceutical industries, etc.

Samplings are carried out using swabs. A swab is a tool comprising a stem and a sampling tip at one end of the stem. The tip may have a flat or revolving (like a cotton bud) shape. In general, the area of the surface over which sampling is carried out is a square and typically with sides measuring 5 cm. Optionally, the swab may comprise at the end of the stem opposite to the sampling tip a screw cap having a base and an annular post generally threaded and extending from the periphery of the base substantially perpendicular thereto and on only one side. The stem is then linked to the screw cap through the base so as to extend on the same side as the annular post.

In general, an operator has to get inside the industrial vessel to carry out the necessary samplings therein. Yet, the industrial vessels, which are confined spaces, are considered as dangerous spaces and many fatal accidents, including in the pharmaceutical industry, have happened before.

That is why, in order to ensure safety of the interveners, sampling operations require a considerable staff mobilisation: before and after the sampling operations, mobilisation of the technical department for recording deposit and release of the equipment; during the sampling operation, mobilisation of a supervisor trained in operations in a confined space and of an operator also trained and having a medical fitness enabling him to descend into a confined space. These operations also require the mobilisation of considerable means such as the administrative department for drafting a permit to penetrate into a confined space validated by a person in charge for the area, a EHS (environment, health, and safety in the industry) team, the supervisor and the operator and for drafting a deposit and release request validated by the technical department, the person in charge for the area, the EHS department and the operator; material resources such as a rope ladder for the operator to get inside the vessel which has been decontaminated beforehand, a harness for the operator, a tether hooked to the harness of the operator and bound to the supervisor, a fall-protection device for the event of the operator fainting or being dizzy, a pulley system to lift a victim (including the operator) up to the dome of the vessel, a portable oxygen meter and possibly a supplied air respirator for the operator. Thus, these operations mobilise at least 4 to 5 persons and are time-consuming.

Methods that do not require a person to descend are used in some industries such as the pharmaceutical industry. These methods use a sampling stick held at one of its ends by the operator positioned outside the vessel and to the other end of which a swab is secured. The sampling stick is telescopic and typically comprises a pole at the tip of which an angular adapter having two arms rotatably mounted relative to one another is secured. One of the arms is used in securing to the pole and the other end in receiving an insert for securing the swab.

The use of the sampling stick allows avoiding requiring a person to descend to carry out the sampling. However, handling the stick is not easy.

Indeed, the operator who has descended into the vessel carries out the bacteriological sampling by sweeping the sampling tip of the swab over the surface so as to cover a surface measuring about 5 cm by 5 cm. In general, the passage of the tip over the surface is performed through back-and-forth movements along a first direction at first, and then, when the entire surface is covered, through back-and-forth movements along a second direction perpendicular to the first direction. Moreover, in the case of a revolving tip, the operator imparts a rotational movement thereon about an axis formed by the stem of the swab while running it over the surface.

It is easily understandable that such movements are not easy to apply at all to a swab disposed on a bent adapter at one end of a pole which would be handled by the other end. The authors have carried out tests with a sampling stick. The movement to be applied to the swab has been difficult to perform and the gesture could not be repeated.

SUMMARY OF THE INVENTION

An objective of the invention is to overcome at least one of the drawbacks of the prior art.

To this aim, the present invention provides a module for sampling from a surface of an industrial vessel without requiring a person to descend into the industrial vessel using a swab comprising a stem and a sampling tip, comprising a swab holder and a conveyor;

the swab holder being adapted to receive and secure one end of the stem of the swab; and the conveyor being configured to move the swab holder at the surface of the vessel.

This sampling module enables an automated sampling using a swab allowing the application of the desired movement to the swab during sampling. Moreover, tests that have been carried out show that the gesture is repeatable. This eliminates the need for an operator to descend inside the industrial vessel.

Other optional and non-limiting features are the following ones.

The conveyor may be configured to move the swab holder parallel to the surface.

The conveyor may be configured to move the swab holder in translational motion along one or two axis/axes parallel to the surface, in particular two axes perpendicular to each other.

The conveyor may comprise a first motor for moving the swab holder along a first axis of travel parallel to the surface and a second motor for moving the swab holder along a second axis of travel parallel to the surface and non-collinear with the first axis of travel, preferably perpendicular thereto.

The swab holder may be adapted so that when the swab is housed therein, the stem of the swab defines an axis. In which case, the conveyor may also be configured to rotate the swab holder about the axis of the stem.

The conveyor may further comprise a motor for rotating the swab holder about the longitudinal axis.

The conveyor may be configured to move the swab holder according to a predefined cycle.

The module may further comprise a tip contact sensor configured to detect contact of the sampling tip with the surface.

The module may further comprise at least three legs and a positioning sensor configured to detect contact of the three legs with the surface.

BRIEF DESCRIPTION OF THE DRAWINGS

Other objectives, features and advantages will become apparent on reading the following description with reference to the drawings provided for illustrative and non-limiting purposes, among which

DESCRIPTION OF THE PREFERRED EMBODIMENTS

Figure 1:
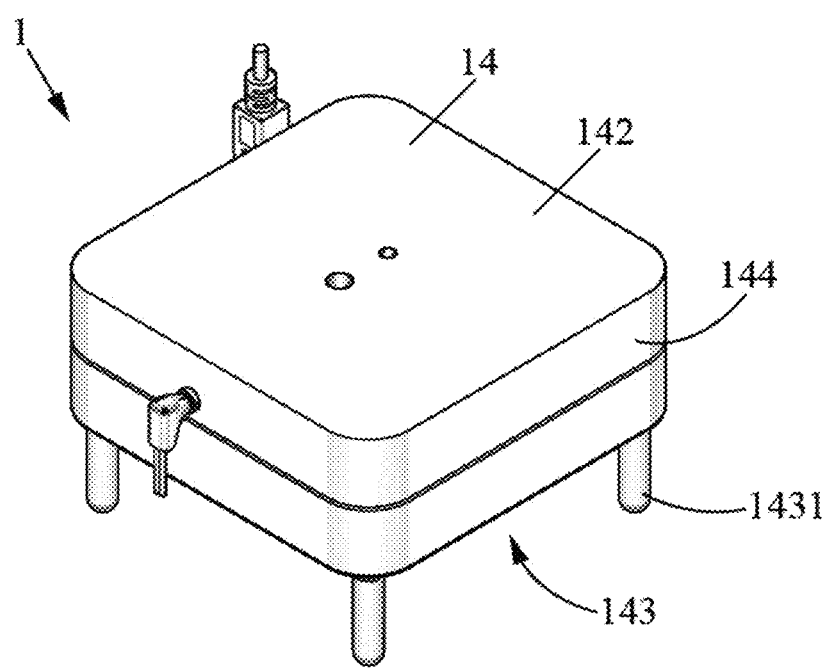
FIG. 1 is a perspective view of a sampling module according to the invention.
Figure 2:
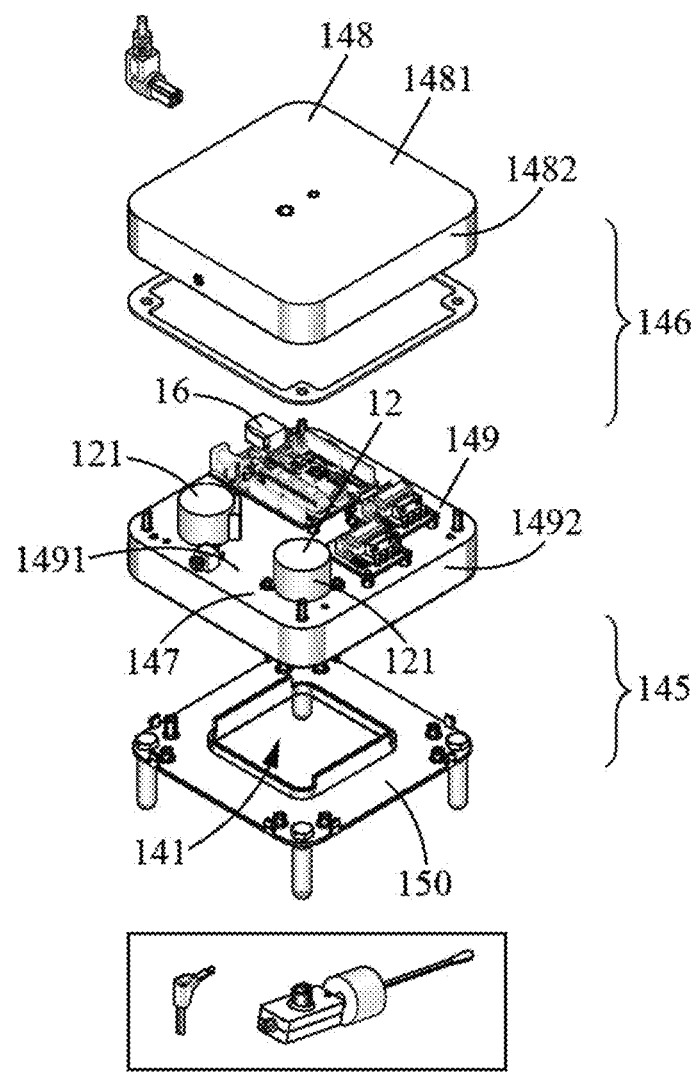
FIG. 2 is an exploded view of the sampling module of FIG. 1 without the transmission assembly.
Figure 3:
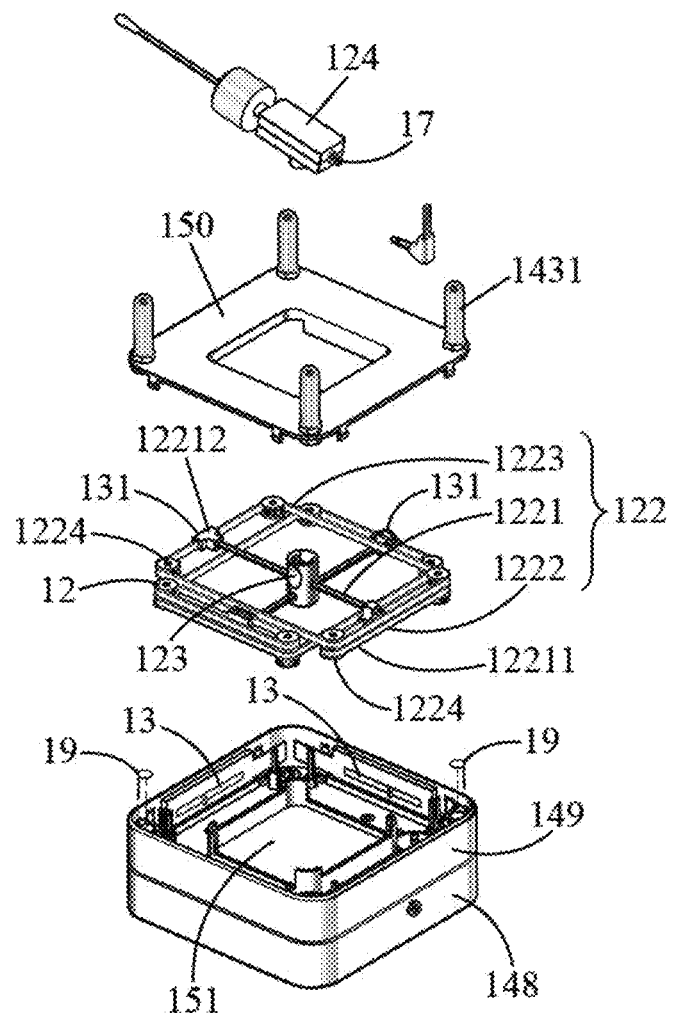
FIG. 3 is a partial exploded view of the conveyor compartment of the sampling module of FIG. 1.
Figure 4:
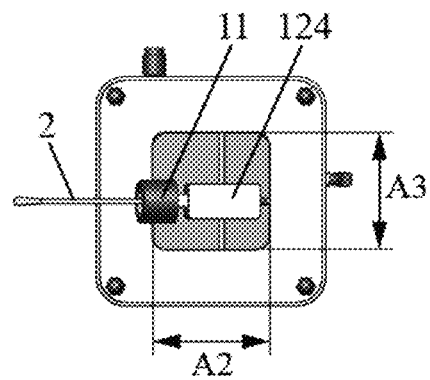
FIG. 4 is a bottom view of the sampling module of FIG. 1.
Figure 5:
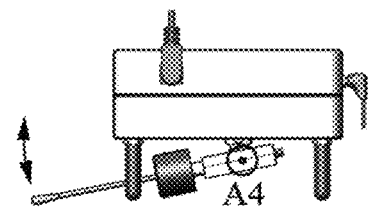
FIG. 5 is a side view of the sampling module of FIG. 1.
Figure 6:
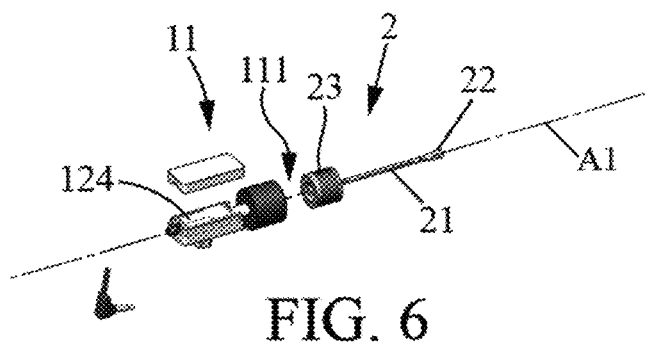
FIG. 6 is an exploded view of a swab holder with the swab usable with the sampling module of FIG. 1.
Figure 7:
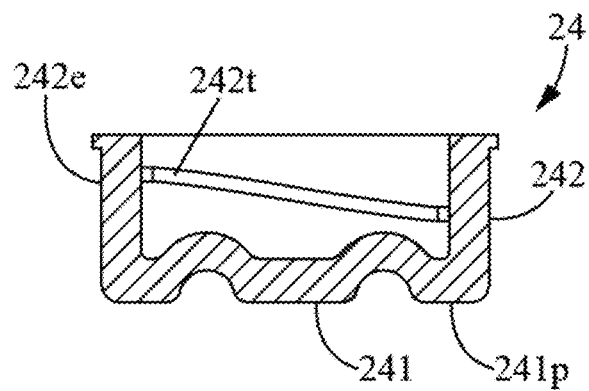
FIG. 7 is a sectional view of a screw cap serving as a securing end of the swab illustrated in FIG. 6.
Figure 8:
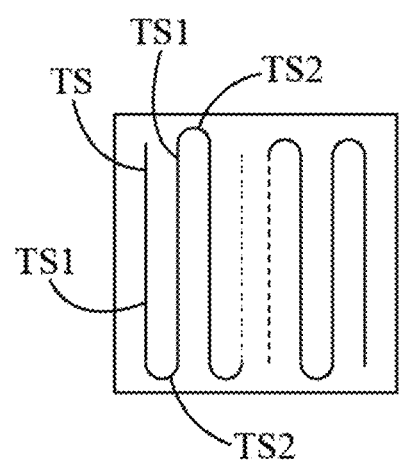
FIG. 8 is a diagram of the serpentine trajectory that the sampling module of FIG. 1 can impart to the swab.

A sampling module according to the invention will be described in detail hereinafter with reference to FIGS. 1 to 8.

The sampling module 1 is a module for sampling from a surface of an industrial vessel without requiring a person to descend into the industrial vessel. Sampling is carried out using a swab 2 comprising a stem 21, a sampling tip 22 at a first end of the stem 21 and a securing end 23 at the other end (second end) of the stem 21 opposite to the first end. The securing end 23 may simply consist of the second end of the stem or a screw cap 24 attached to this second end (cf. FIG. 7). Typically, a screw cap 24 comprises a base 241 and an annular wall 242 extending from a periphery 241p of the base 241, generally perpendicularly to the latter, and on only one side. When the second end of the stem 21 is secured to such a screw cap 24, the stem extends on the same side of the base 241 as the annular wall 242. The annular wall 242 has an internal threading 242t. The outer surface 242s of the annular wall may have an embossment to facilitate gripping the screw cap 24. In general, the embossment consists of an angular series of grooves and ribs extending parallel to one another. In general, the screw cap 24 in this type of swabs 2 is adapted to be screwed on a neck of a container at an opening of the latter and within which the swab 2, and in particular the sampling tip 22, is protected.

The sampling module 1 comprises a swab holder 11 and an electric conveyor 12.

The swab holder 11 is adapted to receive and secure the securing end 23 of the swab 2.

Preferably, the swab holder 11 has an orifice 111 which may be blind or open-through and whose cross-section is adapted to receive the securing end 23 of the swab. Preferably, securing is then achieved by friction between the walls of the orifice 111 and the walls of the securing end 23 of the swab.

In a particular embodiment, the securing end 23 of the swab is a screw cap 24. In which case, the swab holder 11 comprises a base and an annular wall extending from a periphery of the base, generally perpendicular thereto, and on only one side forming a U-shaped longitudinal section (cutting the base perpendicularly thereto). The cross-section of the annular wall of the swab holder 11 has the same shape as the cross-section of the annular wall 242 of the screw cap 24 so as to be able to tightly receive the screw cap 24.

The swab holder 11 may be made of metal, plastic or any other inert material, suited for an industrial use, which could be cleaned, sanitised and does not emit particles.

Furthermore, the swab holder 11 may be adapted for the insertion of the securing end 23 of the swab 2 along an insertion axis A1, the insertion axis A1 and the axis of the stem 21 being coincident. Preferably, the sampling module 1 is supplied with a plurality of swab holders 11 which are then interchangeable in order to house different types of swabs 2 for the shapes and dimensions of the securing end 23 to fit onto. In this case, each swab holder 11 of the plurality of swab holders comprises a coupling member and the sampling module 1 also comprises a coupling member for securing the selected swab holder 11. For example, the coupling member of the swab holders 11 may consist of a rod and that of the sampling module 1 may consist of an orifice (whether blind or open-through) for the insertion of the rod. Alternatively, the coupling member of the swab holders 11 comprises an orifice (whether blind or open-through) and the sampling module 1 comprises a rod. Securing a swab holder 11 in the sampling module 1 may be achieved by different reversible securing methods, for example, screwing, clipping or friction.

The conveyor 12 is configured to move the swab holder 11 at the surface of the vessel.

Furthermore, the conveyor 12 may be configured to move the swab holder 11 parallel to the surface. In which case, the conveyor 12 may be configured to set the swab holder 11 in translational motion along one or two axis(axes) A2, A3 parallel to the surface, non-collinear and generally perpendicular to each other.

For this purpose, the conveyor 12 may comprise a motor 121 to set the swab holder 11 in translational motion along an axis A2 parallel to the surface.

For example, the conveyor 12 comprises a transmission assembly 122 with a conveyor bar 1221, a first annular belt 1222 and a second annular belt 1223. The conveyor bar 1221 comprises a first end 12211 secured to the first annular belt 1222 and a second end 12212 secured to the second annular belt 1223. In this example, the transmission assembly 122 also comprises a set of four pinions 1224 disposed so as to form the corners of a rectangle two sides of which are parallel to the conveyor bar 1221 (called parallel sides) and two are perpendicular to the latter (called perpendicular sides). The first belt 1222 is disposed so as to surround two of the four pinions 1224 on one of the perpendicular sides thereby forming two parallel lines, the first end 12211 of the conveyor bar 1221 being secured to the line the innermost within the rectangle formed by the pinions 1224. The second belt 1223 is disposed so as to surround the four pinions 1224; either above or under the first belt 1222. Finally, one of the pinions is coupled to the motor 121, the belts 1222, 1223 transmit the movement to the other pinions 1224. The transmission assembly 122 then convers the rotational movement of the motor 121 into a translational movement along an axis A2 parallel to the perpendicular sides of the rectangle. The swab holder 11 is then secured to the conveyor bar 1221, for example with the latter running across the swab holder or via a hub 123 configured to receive the swab holder 11, the conveyor bar 1221 running across the hub 123.

If the conveyor 12 is configured to move the swab holder 11 in translational motion along a second axis A3 parallel to the surface, then it comprises a second motor 121 and a second transmission assembly 122. The first and second transmission assemblies 122 having the same composition but are positioned at an angle of 90° with respect to one another. The swab holder 11 is then secured to the two conveyor bars 1221 so that these run across the swab holder 11, in particular on top of each other, or via a hub 123 crossed by the conveyor bars 1221, in particular in top of each other.

Furthermore or alternatively, the conveyor 12 may also be configured to rotate the swab holder 11 about the longitudinal axis A1 formed by the stem 21 of the swab 2 when the securing end 23 of the swab 2 is housed within the swab holder 11. For this purpose, the conveyor 12 may comprise a motor 124 whose shaft is linked to the swab holder 11 so as to enable a rotation of the swab 2 about the longitudinal axis A1. Furthermore or alternatively, the swab holder 11 may comprise an adapter provided with a motor for rotation the swab holder 11.

Furthermore or alternatively, the conveyor 12 may be configured to move the swab holder 11 in rotation about an axis A4 orthogonal to the longitudinal axis A1 and parallel to the surface to be treated. For example, the conveyor 12 may comprise a motor to this end. This is in particular useful in order to avoid the sampling tip 22 touching a surface other than the surface to be treated during the positioning the sampling module 1.

Furthermore or alternatively, the movement about the axis A4 is achieved by acting on bending the stem of the swab 2 rather than by a motor. Thus, the swab holder 11 adapted so that, when in the normal position of use, the axis A4 parallel to the surface is located at a distance h from the surface, the distance h being considered orthogonally to the surface, and if the axis of the stem of the swab forms an angle θ with a line orthogonal to the surface, we have:

$$L > \frac{h}{\cos(\theta)} \quad [\text{Math. 1}]$$

(E1), with L the length of the swab from the axis A4 to the end of the sampling tip.

The swab holder is then mounted on a rotary spring so that when the sampling module is positioned over the surface, the length of the swab satisfying the inequation (E1), the surface exerts a force on the sampling tip making the axis of the stem pivot to increase the angle θ. This ensures contact between the sampling tip and the surface.

Furthermore or alternatively, the conveyor 12 may be configured to move the swab holder 11 according to a predefined cycle. In which case, the predefined cycle may comprise a period where the movement of the swab holder 11 (considered on the surface where the sampling is carried out) follows a serpentine trajectory TS (cf. FIG. 8), that is to say a trajectory comprising a plurality of parallel straight sections TS1 whose direction of travel is alternate, the straight sections TS1 being connected to each other in pairs by curved or straight connecting sections TS2 so as to form the serpentine trajectory TS. The predefined cycle may further comprise a second period where the movement also follows a serpentine trajectory, but the orientation of the parallel straight sections is perpendicular to that one of the first period. Furthermore, the cycle may also comprise a period during which the swab is rotated. This period may be comprised in the first period and/or the second period. It may spread over the whole of at least one of these periods.

Preferably, the cycle allows sweeping a 1 to 50 cm$^2$, preferably 5 to 40 cm$^2$, preferably about 25 cm$^2$, wide surface. For example, the cycle allows sweeping a square or rectangular surface. In the case where sweeping is carried out over a square surface, the latter preferably has side dimensions comprised between 1 and 10 cm, preferably between 3 and 8 cm, preferably about 5 cm. Preferably, the cycle allows sweeping a surface in accordance with the applicable recommendations of the European or American Pharmacopoeia for sampling microbiological samples.

Furthermore or alternatively, the conveyor 12 may be configured to send a completed sampling signal at the end of the predefined cycle. This signal may consist of an audible or visual signal. This signal may also consist of a digital signal sent to another module of a sampling stick as described hereinafter.

The sampling module 1 may further comprise a first contact sensor 19 configured to detect contact of the sampling module 1 with the vessel. For example, the first sensor 19 may consist of a pressure sensor. The pressure sensor may be disposed in abutment against pads 1431 described later on, in particular in an intermediate cover 149 described in more details hereinafter. Preferably, there are two pressure sensors diametrically opposite to one another with respect to the centre of the sampling module 1.

The sampling module 1 may further comprise a second contact sensor configured to detect contact of the sampling tip 22 with the surface. Indeed, an improper contact of the sampling tip 22 with the surface may result in an error in counting the microorganisms that are present on the surface. Each of the contact sensors 13 may be optical or mechanical. Each of the contact sensors may comprise an indicator, for example an electric light, indicating the existence and/or absence of contact. Furthermore or alternatively, the contact of the sampling module 1 with the vessel and/or the contact of the sampling tip 22 with the surface may be indicated by one or several indicator(s), for example lights, advantageously installed on another element of the sampling stick. Besides or alternatively, each of the contact sensors may be configured to generate a contact electric signal indicating the achievement and/or absence of contact.

The sampling module 1 may further comprise a sensor 13 of the position of the conveyor 12. For example, the position sensor is disposed opposite one of the ends of the conveyor bar 1221 to track the travel of the latter. In particular, in the case where there are two transmission assemblies, a first position sensor is disposed opposite one of the ends of the conveyor bar 1221 of the first transmission assembly, the first position sensor extending parallel to the axis A2; and a second position sensor is disposed opposite one of the ends of the conveyor bar 1221 of the second transmission assembly, the second position sensor extending parallel to the axis A3. The position sensor(s) may consist of magnetic sensors. The end of the corresponding transmission bar opposite the position sensor is then provided with a magnet 131.

The sampling module 1 may comprise a casing 14 enclosing the conveyor 12, the swab holder 11 and the contact sensor(s) 13 if this or these is/are provided. The casing 14 has an opening 141 opposite which the swab holder 11 is disposed. Thus, the securing end 23 of the swab 2 is inserted into the swab holder 11 through the opening 141. The opening 141 possibly enables the travel of the swab 2. Alternatively, the swab holder 11 may project from inside the casing 14 outwardly through the opening 141.

Typically, the casing 14 has an upper face 142, a lower face 143 opposite the upper face 142 and a sidewall 144. The upper face 142 and the lower face 143 are referred to with respect to an operating position in which the surface to be treated is horizontal and directed upwards.

In one embodiment, the opening 141 is formed on the sidewall 144. In a second embodiment, the opening 141 is formed on the lower face 143. In which case, the opening 141 may be square shaped (possibly with rounded corners), in particular with a side dimension between 1 and 50 mm.

The lower face 143 may comprise pads 1431 serving as legs, for example 3, 4, 5, 6, 7, 8, etc. in number. The pads 1431 may be made of an elastomeric material. Alternatively, the legs 1431 are integrally formed with the distal face and covered with an elastomeric material. Preferably, the elastomeric material is silicone or ethylene propylene diene monomer.

Preferably, the external shape of the casing 14 is convex in order to avoid any retention area. For example, the general shape of the casing 14 is a parallelepiped with rounded vertices and edges.

Preferably, the casing 14 has a smooth surface, in particular having a surface roughness comprised between 0.1 and 5 mm, in particular in order to avoid stagnation of dust or of other contaminants over the surface of the robot and also to facilitate cleaning and sanitisation.

Preferably, the casing 14 comprises a travel compartment 145 on the opening 141 side and an electronic compartment 146; the two compartments 145, 146 being for example separated by a separating wall 147. For example, in the case where the opening 141 through which the swab holder 11 passes is present on the lower wall 143 of the casing 14, the casing 14 may comprise an upper cover 148, an intermediate cover 149 and a lower cover 150. The upper cover 148 may be made so as to be superimposed with the intermediate cover 149 by fitting together with the latter. Similarly, the intermediate cover 149 may be made so as to be superimposed with the lower cover 150 by fitting together with the latter. In other words, preferably, the intermediate cover 149 is formed from a planar base 1491, for example rectangular-shaped, preferably square-shaped, and a side wall 1492 extending from the edges of the base 1491 and generally perpendicularly thereto. Preferably, the upper cover 148 is formed from a planar base 1481, for example rectangular-shaped, preferably square-shaped, and a sidewall 1482 extending from the edges of the base 1481 and generally perpendicularly thereto. Preferably, the intermediate cover 149 is formed in the same manner as the upper cover 149.

The sidewalls 1482, 1492 of the upper 148 and intermediate 149 covers fit together so that their surfaces are flush with one another. The lower cover 150 has a generally planar shape with the orifice 141, preferably rectangular, or square, shaped. The space formed between the upper cover 148 and the intermediate cover 149 forms the electronic compartment 146 and the space formed between the intermediate cover 149 and the lower cover 150 forms the travel compartment 145.

For example, the travel compartment 145 accommodates the conveyor 12 with the exception of the translational motors 121 and the swab holder 11. For example, the electronic compartment 146 accommodates translational motors 121, a printed circuit board and other electronic components necessary to the operation of the sampling module 1. In which case, the casing 14 advantageously comprises an anti-friction coating 151 in the travel compartment 145 disposed and designed so as to reduce the frictional forces between the swab holder 11 or the hub 123 and the other elements comprised within the travel compartment 145 or between the swab holder 11 or the hub 123 and the separating wall 147.

The sampling module 1 may be powered with electric power by (rechargeable) batteries. Preferably, the sampling module 1 is powered with electric power through a mains connection. For this purpose, the sampling module 1 comprises a connector 16 for wired connection to the mains or to another power supply source. In particular, the connector 16 powers the conveyor 12, preferably the motor(s) 121 for translational motion parallel to the surface to be treated. Furthermore, the connector 16 may also power the rotary motor 124. Alternatively, a second connector 17 is provided on the rotary motor 124 for powering the latter through a connection to either the mains or another power supply source.

The sampling module 1 may be part of an assembly called sampling stick further comprising a pole.

Preferably the pole is a telescopic pole with a sampling end connectable to the sampling module 1 on a connection 18 thereof, and a gripping end opposite to the sampling end. At its gripping end, there may be provided a gripping handle for handling safety and possibly for the comfort of the user.

The sampling stick may further comprise a control secured on the gripping end of the pole. The control enables the operator to handle the sampling module. The control comprises a human-machine interface, for example buttons, joysticks, switches, or a touchscreen.

The control may also be configured to receive different pieces of information.

For example, the control may receive the digital signal sent by the conveyor 12. This digital signal may comprise information on the completion of sampling. The control may also receive the contact electric signal sent by the contact sensor when the latter is provided and when it is configured to send such a signal.

The control may comprise a portable printer configured to print a sampling report. The portable printer may also print on the report any information relating to the sample (date, hour, identity of the vessel, identity of the operator, confirmation that the tool has properly remained in contact with the vessel throughout the entire duration of the sampling, etc.).

The control may comprise an indicator light, for example a light-emitting diode, in particular to indicate the status of the sampling stick and/or of the sampling module.

The control may also comprise a display, for example a LCD screen. The display allows transmitting information about the sampling in real-time to the operator. Preferably, the display is secured on the gripping end of the pole.

The sampling module and the control may be electrically connected to each other by cables preferably passing through the pole. Alternatively, the sampling module and the control may be connected to each other by a wireless network, such as Bluetooth® or Wi-Fi.

The control may constitute a power supply source and is connectable in particular to the connection of the casing to power the latter. In which case, the cable used for the power supply may also be used in information transmission between the sampling module and the control.

Preferably, the pole and the sampling module are dismountable off each other to facilitate maintenance thereof. Also, when the monitoring module is provided, the latter may be dismountable off the pole.

The sampling stick may further comprise a ball-joint angular adapter to be secured between the pole and the sampling module. The angular adapter allows for a greater flexibility in handling the sampling module in order to be able to reach all areas of the industrial vessel.

The sampling stick may be powered by the mains. In this case, it may further comprise a socket. Alternatively, the sampling stick is powered by a battery.

The invention claimed is:

1. A module for sampling from a surface of an industrial vessel without requiring a person to descend into the industrial vessel using a swab comprising a stem and a sampling tip, comprising a swab holder and a conveyor;
    the swab holder being adapted to receive and secure one end of the stem of the swab; and
    the conveyor being configured to move the swab holder at the surface of the vessel,
    wherein the conveyor is configured to move the swab holder parallel to the surface.

2. The module according to claim 1, wherein the conveyor is configured to move the swab holder in translational motion along one or two axes parallel to the surface.

3. The module according to claim 2, wherein the conveyor comprises a motor and a transmission assembly for moving the swab holder along a first axis of travel parallel to the surface;
    the transmission assembly comprising a first annular belt, a second annular belt, a set of four pinions disposed so as to form the corners of a rectangle, and a conveyor bar to which the swab holder is secured and a first end of which is secured to the first annular belt and a second end is secured to the second annular belt so that the conveyor bar is parallel to two opposite sides of the rectangle formed by the set of four pinions;
    wherein the first belt is disposed so as to surround two pinions on one of the sides of the rectangle perpendicular to the conveyor bar thereby forming two parallel lines, the first end of the conveyor bar being secured to the line the innermost within the rectangle; and
    wherein the second belt is disposed so as to surround the four pinions.

4. The module according to claim 3, wherein the conveyor comprises a second motor and a second transmission assembly for moving the swab holder along a second axis of travel parallel to the surface;
    the second transmission assembly comprising a first annular belt, a second annular belt, a set of four pinions disposed so as to form the corners of a rectangle, and a conveyor bar to which the swab holder is secured and whose first end is secured to the first annular belt and a second end is secured to the second annular belt so that the conveyor bar is parallel to two opposite sides of the rectangle formed by the set of four pinions;
    wherein the first belt is disposed so as to surround two pinions on one of the sides of the rectangle perpendicular to the conveyor bar thereby forming two parallel lines, the first end of the conveyor bar being secured to the line the innermost within the rectangle;
    wherein the second belt is disposed so as to surround the four pinions; and
    wherein the conveyor bar of the transmission assembly is perpendicular to the conveyor bar of the second transmission assembly.

5. The module according to claim 4, wherein the swab holder is crossed by the conveyor bar or the conveyor bars.

6. The module according to claim 4, further comprising a hub configured to receive the swab holder and crossed by the conveyor bar or the conveyor bars.

7. The module according to claim 3, wherein the swab holder is crossed by the conveyor bar or the conveyor bars.

8. The module according to claim 3, further comprising a hub configured to receive the swab holder and crossed by the conveyor bar or the conveyor bars.

9. The module according to claim 3, wherein the swab holder is adapted so that when the swab is housed therein, the stem of the swab defines an axis; and wherein the conveyor is also configured to rotate the swab holder about the axis of the stem.

10. The module according to claim 1, wherein the swab holder is adapted so that when the swab is housed therein, the stem of the swab defines an axis; and wherein the conveyor is also configured to rotate the swab holder about the axis of the stem.

11. The module according to claim 10, wherein the conveyor further comprises a motor for rotating the swab holder about the longitudinal axis.

12. The module according to claim 1, wherein the conveyor is configured to move the swab holder according to a predefined cycle.

13. The module according to claim 1, further comprising a contact sensor of the tip configured to detect contact of the sampling tip with the surface.

14. The module according to claim 1, further comprising at least three legs and a positioning sensor configured to detect contact of the three legs with the surface.

15. The module according to claim 1, comprising a casing enclosing the conveyor, the swab holder and, where appropriate, the contact sensor(s);
    the casing having an opening opposite which the swab holder is disposed so that the swab holder is disposed inside the casing or projects from inside the casing outwardly through the opening;
    the casing having an upper face, a lower face opposite to the upper face and a sidewall.

16. The module according to claim 15, wherein the casing has a smooth surface whose roughness is comprised between 0.1 and 5 mm.

17. The module according to claim 1, wherein the conveyor is configured to move the swab holder in translational motion along two axes that are parallel to the surface and perpendicular to one another.

18. The module according to claim 2, wherein the swab holder is adapted so that when the swab is housed therein, the stem of the swab defines an axis; and wherein the conveyor is also configured to rotate the swab holder about the axis of the stem.

19. A module for sampling from a surface of an industrial vessel without requiring a person to descend into the industrial vessel using a swab comprising a stem and a sampling tip, comprising a swab holder and a conveyor;
  the swab holder being adapted to receive and secure one end of the stem of the swab; and
  the conveyor being configured to move the swab holder at the surface of the vessel,
  further comprising a contact sensor of the tip configured to detect contact of the sampling tip with the surface.

20. A module for sampling from a surface of an industrial vessel without requiring a person to descend into the industrial vessel using a swab comprising a stem and a sampling tip, comprising a swab holder and a conveyor;
  the swab holder being adapted to receive and secure one end of the stem of the swab; and
  the conveyor being configured to move the swab holder at the surface of the vessel,
  further comprising at least three legs and a positioning sensor configured to detect contact of the three legs with the surface.

* * * * *